United States Patent [19]

Halimi

[11] Patent Number: 5,000,672
[45] Date of Patent: Mar. 19, 1991

[54] ICE CREAM SCOOP WITH HEATED FORMING EDGE

[76] Inventor: Edward M. Halimi, P.O. Box AB, Incline Village, Nev. 89450

[21] Appl. No.: 383,168

[22] Filed: Jul. 19, 1989

Related U.S. Application Data

[63] Continuation-in-part of Ser. No. 234,093, Aug. 19, 1988.

[51] Int. Cl.$^5$ .......................... A23G 9/00; B29C 67/24
[52] U.S. Cl. .................................... 425/279; 425/282; 425/DIG. 13
[58] Field of Search ............... 625/151, DIG. 13, 279, 625/278; 219/227, 230, 241, 229, 236; 425/276, 277, 281, 282

[56] References Cited

U.S. PATENT DOCUMENTS

| | | | |
|---|---|---|---|
| 1,971,577 | 8/1934 | Parker | 425/281 |
| 1,974,051 | 9/1934 | Kelly | 425/281 |
| 2,256,770 | 9/1961 | Armstrong | 425/279 |
| 2,859,325 | 11/1958 | Lea | 425/279 |
| 3,421,456 | 1/1969 | Weinstein | 425/280 |
| 3,513,290 | 5/1970 | Barley et al. | 219/240 |
| 3,927,684 | 12/1975 | Lau | 219/240 |
| 4,347,428 | 8/1982 | Conrad et al. | 219/241 |
| 4,354,093 | 10/1982 | Zago | 219/241 |
| 4,386,900 | 7/1983 | Sultan | 425/DIG. 13 |
| 4,553,921 | 11/1985 | Lamphere et al. | 425/279 |
| 4,565,916 | 1/1986 | Tsuji et al. | 219/230 |

Primary Examiner—Jay H. Woo
Assistant Examiner—Khanh P. Nguyen
Attorney, Agent, or Firm—Herbert C. Schulze

[57] ABSTRACT

A scooper for scooping ice cream and similar cold hardened material from a container including a scooping device with a handle which handle incorporates safety connected electrical device connected to and capable of activating heating elements buried within the scooper itself, and alternately a coating of teflon or the like on the scooping device, wherein the most preferred embodiment incorporates the heated, metallic, heated leading edge.

2 Claims, 3 Drawing Sheets

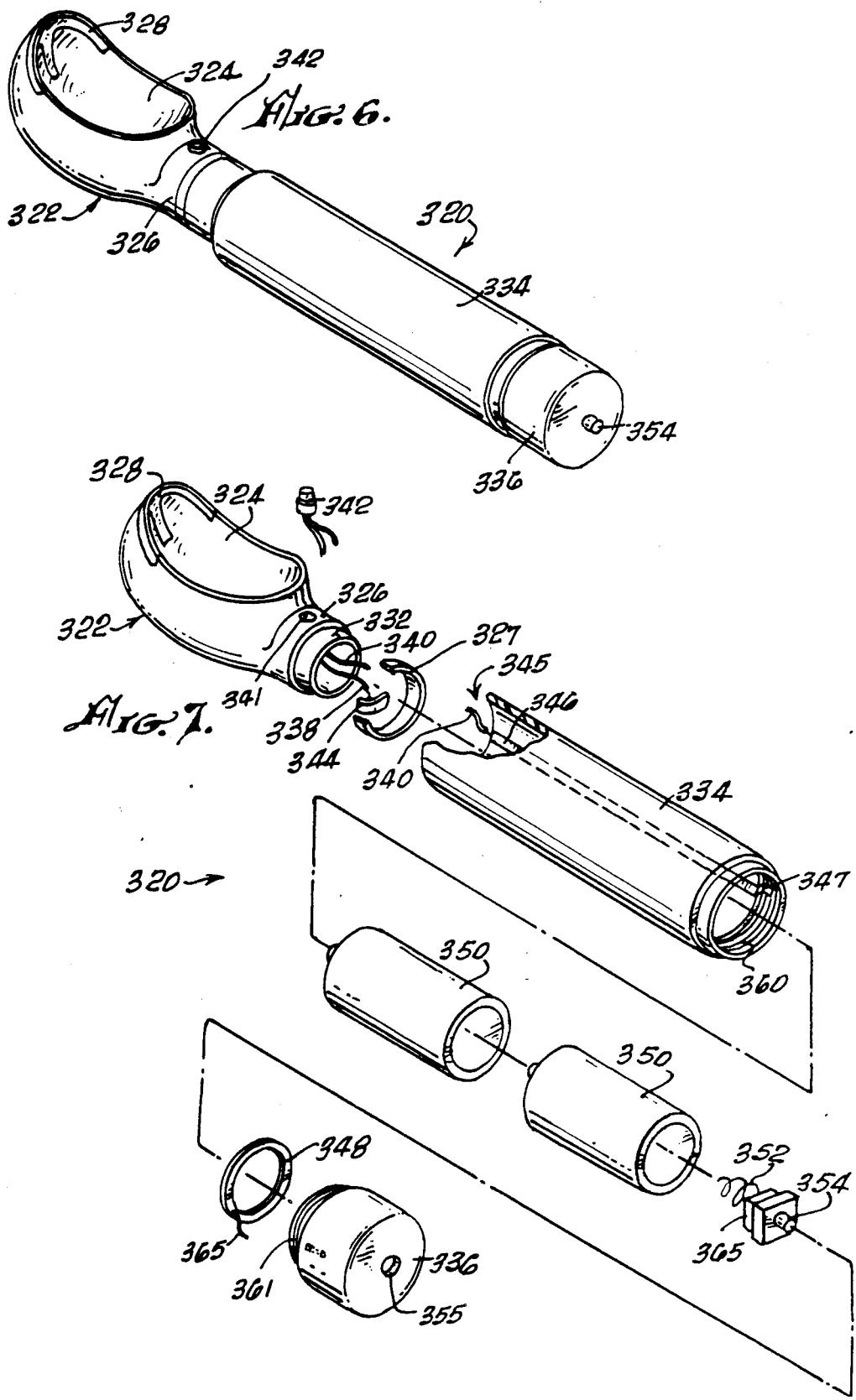

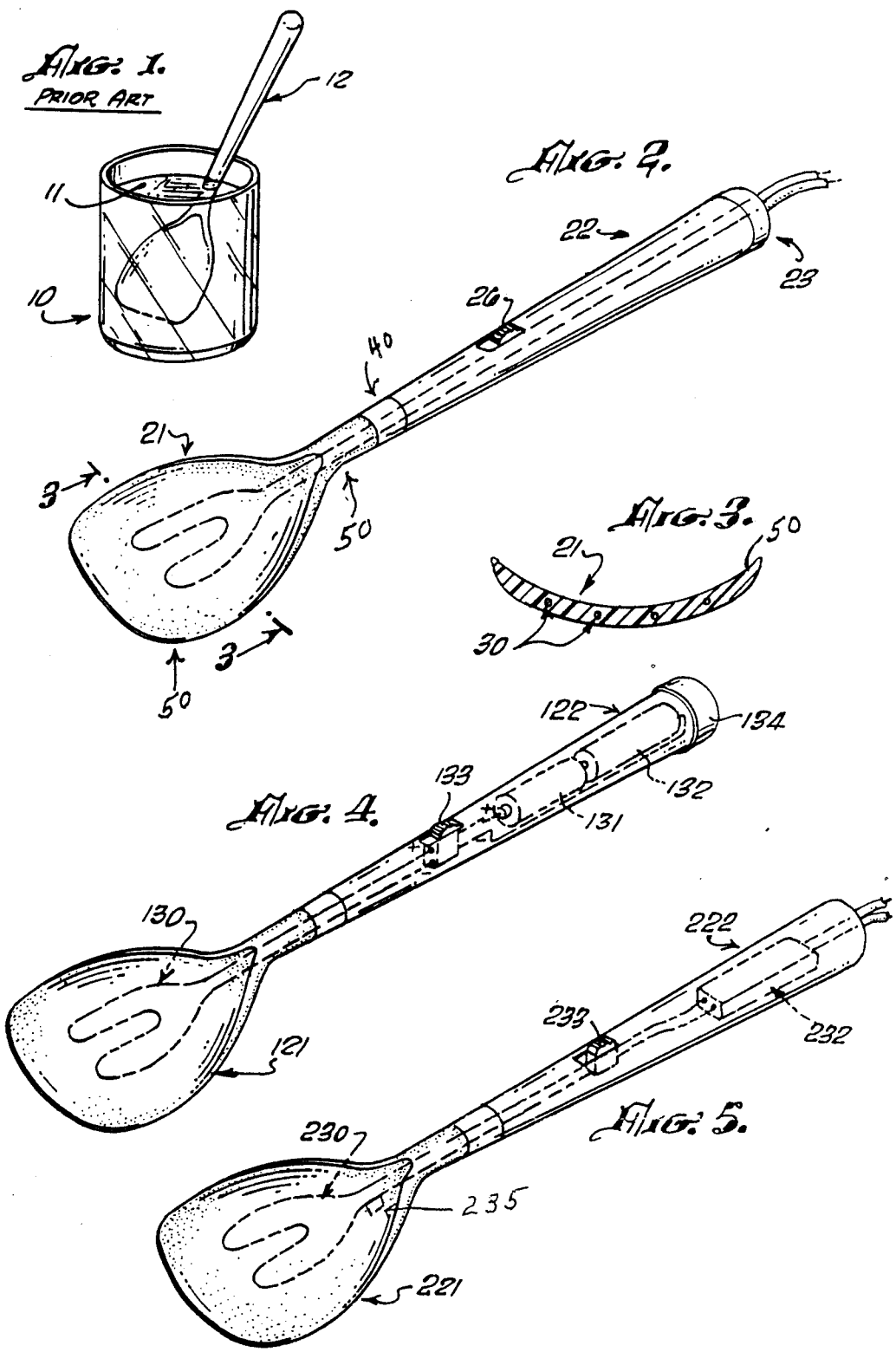

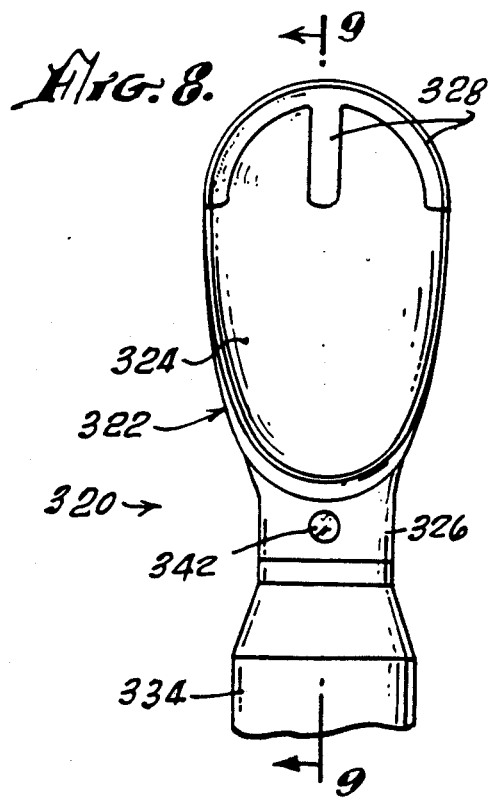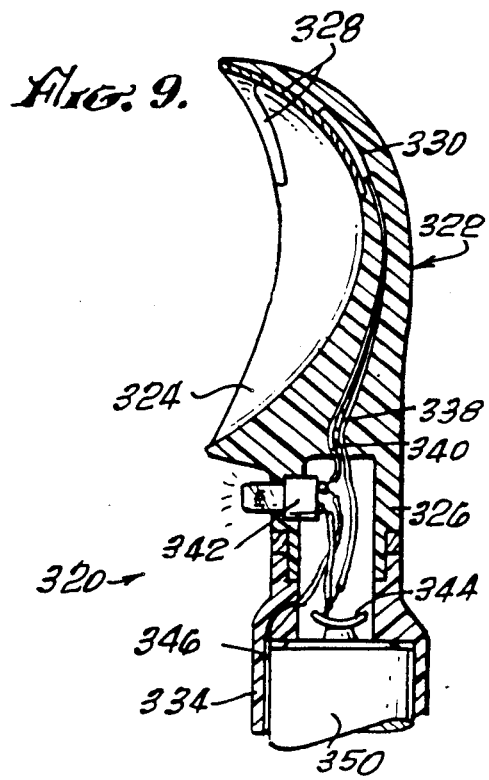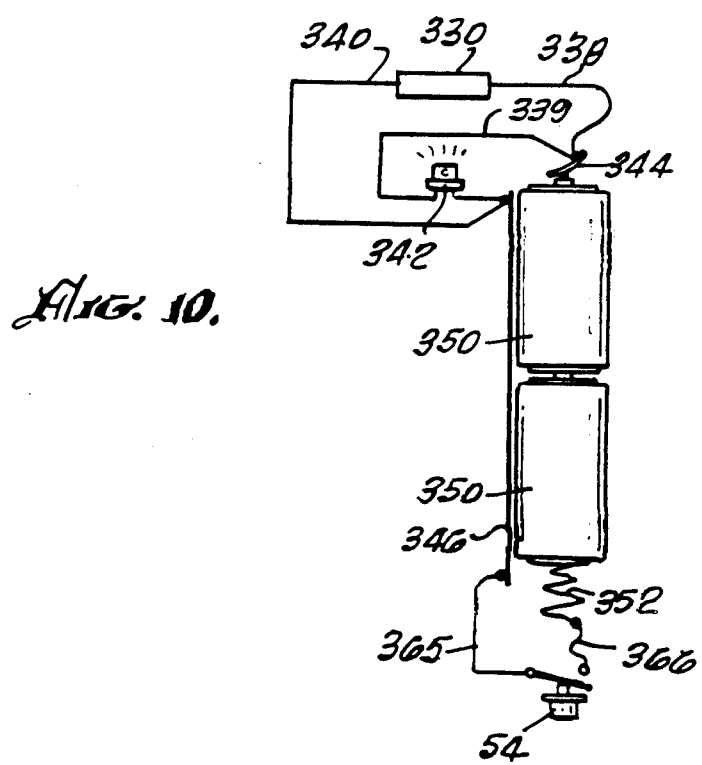

ICE CREAM SCOOP WITH HEATED FORMING EDGE

CROSS REFERENCE TO RELATED PATENT APPLICATIONS

This application is related to, and is a continuation in part, of my co-pending patent application for Heated Ice Cream Scooper Ser. No. 07/234,093 filed Aug. 19, 1988.

BACKGROUND OF THE INVENTION

1. Field of the Invention

This invention is in the general field of scooping devices designed to scoop out measured or other amounts of ice cream or similar materials which are cold and in a relatively solid state;

The invention is even more directly related to such a scooping device wherein electrically activated heating elements are encompassed and buried within the scooping device itself;

The invention is even further directed to such a device wherein electrical power means are either encompassed within the handle of the scooping device or are connectable in a safe manner to an exterior source of electrical power;

The invention is even more particularly directed to such a device wherein a metallic, electrically heated, leading edge is provided, wherein the heated metallic leading edge literally through the ice cream or the like in forming a complete scoop for removal.

2. Description of the Prior Art

It is quite common for persons using ice cream scoopers, or scooping devices, to place the scooper or scooping device in a container of hot water or into an otherwise heated environment wherein the scooping device is heated so as to cut into and scoop out ice cream or the like with ease. I am aware that there have been some efforts in the past to develop a heated scooping device. There is no prior art known to me in which the unique heated metallic leading edge of the scoop which serves the purpose of literally cutting through the ice cream has been conceived or anticipated.

SUMMARY OF THE INVENTION

Ice cream and similar frozen products are in wide use throughout most of the world. In general such frozen items, as ice creams, are basically supplied in containers of one size or another in much larger quantities than tht used for individual servings.

The common practice in serving ice cream is to scoop out a measured amount or other individual amounts with a basically spoonlike tool generally referred to as a scooper. Such scoopers are generally made of aluminum or other metallic material.

It is quite common, at ice cream parlors and the like, and even in the home, to heat such scoopers by placing them into a container of hot water or holding them under a running stream of hot water, or in some other manner heating the scooping device so that it cuts more readily through the ice creams, or the like, and thus makes the task of serving, particularly for purposes of filling ice cream cones and the like, simpler and less of a physical strain upon the person doing the serving.

Such practices are effective within limitations, but require periodic replacing of the scooper into the heating environment, and, in time, may result in somewht unattractive discolorations, and in any event, ususally leaving a slight amount of ice or water on the ice cream.

I have studied this problem at length and have considered and developed an improved scooper for ice cream and the like which consists of a scooper formed of a preferably metallic material with good heat conductivity characteristics. I have imbeded within such scooper, or in conjunction with the exterior surfaces thereof, suitable and effective heating elements such as nichrome wire or the like. I have connected the wires within the handle of the scooper so that they may receive electrical energy. In one form there can be batteries within the handle which may be rechargeable or non-rechargeable as desired. In another form there may be a safety connection with a suitable transformer or the like within the handle such that direct connection may be made to a source of electricity such as ordinary house current.

A thermostatic, or other, control may be included in the circuit to prevent over heating of the device nd to insure uniformity of heating even when the device is not used for a period of time.

As a further aid for use with an ice cream scooper, the scooper device, itself, whether heated or not may be coated with teflon, or the like, to make the scooper easier to use.

As a most desired form of a device to easily scoop extremely hard ice cream and the like I have now conceived and developed a new ice cream scoop with a heated metallic leading edge which cuts through a bulk of ice cream or the like and allows the scoop to form a perfectly formed scoop of ice cream with no excessive melting due to a generally heated scooping member.

It is an object of this invention to provide a scooper for ice cream and the like, which is heated within itself to aid in scooping out frozen ice creasm or othr such products;

Another object of this invention is to provide such a device as has been described wherein the source of heating will be electrical energy safely connected to heating elements within the scooping device;

Another object of this invention is to provide such a device as heretofore described wherein it may be kept at a constantly heated temperature for aid in scooping out ice cream or the like from a container;

Another object of this invention is to provide an ice cream scooper coated with teflon or the like for easier scooping of ice cream or the like;

Another object of this invention is to provide an ice cream scooper as heretofore described but wherein there is a heated metallic leading edge which cuts through the ice cream to form a perfect scoop of ice cream within the scoop portion of the ice cream scooper.

The foregoing, and other, objects and advantages of this invention will become apparent to those skilled in the art upon reading the description of a preferred embodiment which follows, in conjunction with a review of the appended drawings.

BRIEF DESCRIPTION OF THE DRAWINGS

FIG. 1 is an illustration of the prior art in heating ice cream scoopers;

FIG. 2 is a perspective of a preferred embodiment of the device of this invention;

FIG. 3 is section on 3—3 of FIG. 2;

FIG. 4 is a partially broken away, partially in phanton, view of one method of supplying electical power to the device of FIG. 2;

FIG. 5 is a schematic partially in phantom view of an altenate embodiment;

FIG. 6 is a perspective of an alternate preferred embodiment of a device incorporating a heated leading edge of the scoop element;

FIG. 7 is an exploded, partially broken away, view of the device of FIG. 6;

FIG. 8 is a plan view of the scooping head of the device of FIG. 1 somewhat enlarged;

FIG. 9 is a section on 9—9 of FIG. 8; and

FIG. 10 is a schematic illustration of the electrical circuitry utilized in the device of FIG. 6.

DESCRIPTION OF A PREFERRED EMBODIMENT

FIG. 1 is for the purpose of illustrating the prior art most commonly used for warming ice cream scoopers and keeping them warm for ease of use in scooping ice cream or the like from a container. FIG. 1 includes a jar or the like 10, filled with hot water or the like 11, and with a scoop member 11 having a handle 12 resting in the hot water in the jar.

FIG. 2 illustrates a preferred embodiment of an apparatus to practice this invention. The ice cream scooping device generally 20 comprises the scooping member 21 and a handle 22 joined together by an insulating collar 40 of plastic or the like. The scooping member 21 and the handle 22 may be fastened by adhesive, or molded into place, upon the insulating collar, the purpose of which is to prevent heat from flowing from the scooping member to the handle member. A switch 26 is shown mounted on the handle which switch will be utilized to activate the electricity to the scooping member. In this version, an electrical connecting socket 23 is provided into which an electrical current may be introduced in order to activate heating wires within the scoop portion to impart heat to the scooping portion. It should be understood alternatively that the scooping portion itself could become a conductor and cause to be warmed by the passage of electricity through the scooping portion itself.

The teflon coating 50 of the scooping portion may be applied over the heated scooping portion, or left off, as desired. The coating 50 may even be used on an unheated scooper, which would look like the scooping element of FIG. 2, but without the heating wires, electrical connection, switch and collar.

FIG. 3 is a section on 3—3 of FIG. 2 and shows the scooping portion 21 with microme or other appropriate heating wires 30 imbeded within the scooping portion itself.

FIG. 4 is an alternate embodiment showing the unit as one member comprising the handle 122, the scooping portion 121 and wires shown in phantom at 130. A pair of batteries 131 and 132 are provided connected to the heating wire as indicated with a switch 133 to activate the electrical current when desired. The end 134 is removable for purposes of replacing batteries.

FIG. 5 shows another alternate embodiment wherein the scooping element 221 has wires 230 imbeded therein and is provided with a customary handle 222 with an activating switch 233 to activate the current within the handle. Within the handle at 232 is a transformer or the like and a pair of plugs at 234 or a socket in lieu thereof may be provided to which direct electrical current from a surce of electricity may be connected.

In use, a thermostat 235 (not shown in FIGS. 2 and 4), known in the art, may be inserted in connection with the wires 130 and 230 and 30 may be desired. The details of a thermostat have not been shown as they are well known in the art. Likewise, automatic control of the amount of heat may be obtained by experimenting with different sizes of wires and different amounts of electricity to reach the desired temperature.

In the embodiments shown in FIGS. 4 and 5 an insulating collar such as is shown in FIG. 2 may likewise be installed if desired so that the handle does not receive an undue amount of heat which could cause some discomfort to the operator.

FIG. 6 illustrates an ice cream scooper generally 320 which incorporates a most unique heated leading edge 328 on the scooping head 322 at the leading portion of the scooping depression 324. The scooping head 322 is joined to handle 334 at at decorative joinder ring 326. The handle 334 is hollow and contains batteries. A cap 336 is provided to close the batteries in place and a switch 354 is likewise provided for activation of the electrical power which will be described below.

FIG. 7 shows clearly all of the elements of this most unusual and highly effective new apparatus. A scooping head 322 with the scooping depression 324 are shown with the heated leading edge 328 in place. The leading edge is made of a heat conducting metallic material or the like. The neck 326 has a reduced portion at 332 which reduced portion is surrounded by a decorative ring 327. The reduced portion 332 or the neck 326, with the ring 327 in place, fits within the opening 345 in the hollow body portion 334 of the handle. A light emitting diode 342 is mounted within the hole 341 in the neck 326.

An electric conducting strip 346 is mounted within the interior of the handle 334 and is connected to electrical wire 340 which goes into the head, through the neck, in a circuitry which is as shown in FIG. 10. This strip 346 is bent over an inside shoulder at 347 adjacent the interior threads 360. The cap portion 346 has threads 361 which screw into the threads 360. An electrical conducting ring 348 makes contact with the bent shoulder 347 and is connected to an electrical lead 365 passing to one of two leads from the switch element 354 mounted through opening 355 in cap 336. The switch will be of customary construction wherein a contact will be made upon activating the switch between the lead 365 and lead 366 fastened to electrical conducting spring element 352. Thus, electrical energy from the negative side of two batteries 350 will pass through the switch 354 when closed or will be prevented from passing therethrough when opened. The electrical energy will then travel upward through strip 346 tolead 340 which goes to one side of light emitting diode 342 and also goes to one side of thermister 330. The other leg of the electrical circuit, in this case the positive side, will contact a spring loaded contact 344 (as particularly shown in FIGS. 9 and 10). The electrical circuit is completed between the negative side of the two batteries in the handle through the contact strip and connecting wire 340 and 365 to one side of the light emitting diode and the thermister 330, and the positive side through the contact 344 as indicated and through wire 338 to the other side of the thermister 330 and through 339 to the other side of light emitting diode 342. When the switch 354 is on, the light emitting diode 342 will be lit and the thermister 330 will receive electrical energy and will heat the metallic leading edge 328 which is carried by the upper edge of the scoop body and depression as indicated. The thermister 330 is located upon the back of an extending heat conducting element which is a portion of the heated leading edge 328.

The preferred light emitting diode is number L200PR4D 25 milliwatt having forward current of 2.1 to 2.8 volts as supplied by LEDtronics Inc, of Torrance California. The preferred thermister is a Texas Instruments 1.2 ohm, 2.3 volt, 80 degrees centigrade thermister as supplied by Texas Instruments. Other light emitting diodes and other thermisters may be used. It should also be noted that the system will work without the light emitting diode, but this is a useful feature since it visually shows whether the system is working or not.

In use, the heated leading edge 328 cuts quickly through frozen ice cream or the like to fill the scoop with the proper portion of ice cream appropriately formed in accordance with the shape of the leading edge and the scoop depression. In cutting through in this manner the ice cream is not damaged nor melted excessively and yet a perfect portion of ice cream is formed and dispensed.

Under very adverse conditions it is possible to combine this leading heated edge with the completely heated unit such as is shown in FIGS. 1 through 5 and which can be utilized in a scoop of the shape indicated in FIGS. 6 through 10 or in another shape such as shown in FIGS. 1 through 5. Thus the leading edge will cut through the ice cream and the heated scoop portion could maintain heat and avoid adherence to the scoop portion.

While the embodiments of this invention shown and described are fully capable of achieving the advantages and objects desired, it is to be understood tht such embodiments are for purposes of illustration only and not for purposes of limitation.

I claim:

1. An ice cream scooping device comprising in cooperative combination: a plastic scooping head having a scooping depression and an edge around the scooping depression, an elongated plastic neck attached to said scooping member, hollow handle suitable to be held by an individual in scooping ice cream with the scooping head attached to said elongated neck, a metallic strip over a portion of the edge of said scooping member, thermister means attached to said metallic strip to control the temperature of the metallic strip by adjusting electrical energy flowing from, electrical energy means carried within said hollow handle for supplying electrical energy to said metallic strip, and means connecting said electrical energy means to said thermister means in such manner that said thermister means receives electrical energy from said electrical energy means.

2. The apparatus of claim 1 wherein the electrical energy means within said handle comprises battery means suitable to provide electrical energy to said thermistor means and said metallic strip and wherein light emitting diode means is connected to said electrical energy means and said thermister means in such manner as to give a visual indication when said thermister means is receiving electrical energy.

* * * * *